(12) United States Patent  (10) Patent No.: US 9,208,034 B2
Palagummi  (45) Date of Patent: *Dec. 8, 2015

(54) DETERMINING SECURITY HOLES OF A BACKUP IMAGE

(71) Applicant: CA, Inc., Islandia, NY (US)

(72) Inventor: Siva Sai Prasad Palagummi, Hyderabad (IN)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,305

(22) Filed: Aug. 25, 2014

(65) Prior Publication Data

US 2014/0365441 A1  Dec. 11, 2014

Related U.S. Application Data

(63) Continuation of application No. 12/782,318, filed on May 18, 2010, now Pat. No. 8,843,444.

(51) Int. Cl.
*G06F 17/30* (2006.01)
*G06F 11/00* (2006.01)
*G06F 11/14* (2006.01)
*G06F 21/57* (2013.01)
*G06F 21/64* (2013.01)

(52) U.S. Cl.
CPC ........ *G06F 11/1469* (2013.01); *G06F 11/1448* (2013.01); *G06F 17/30144* (2013.01); *G06F 21/57* (2013.01); *G06F 21/64* (2013.01)

(58) Field of Classification Search
USPC ..................................... 707/640, 645; 726/24
See application file for complete search history.

(56) References Cited

U.S. PATENT DOCUMENTS

| | | | |
|---|---|---|---|
| 5,948,104 A | 9/1999 | Gluck et al. | |
| 7,707,184 B1* | 4/2010 | Zhang et al. | 707/645 |
| 7,907,565 B2 | 3/2011 | Van De Groenendaal et al. | |
| 8,843,444 B2* | 9/2014 | Palagummi | 707/640 |
| 2004/0003266 A1* | 1/2004 | Moshir et al. | 713/191 |
| 2004/0005873 A1 | 1/2004 | Groenendaal et al. | |
| 2006/0004868 A1 | 1/2006 | Claudatos et al. | |
| 2006/0047930 A1 | 3/2006 | Takahashi et al. | |
| 2007/0283438 A1 | 12/2007 | Fries et al. | |
| 2007/0300205 A1* | 12/2007 | Scian et al. | 717/106 |
| 2010/0132022 A1 | 5/2010 | Venkatasubramanian | |
| 2011/0107043 A1 | 5/2011 | Palagummi | |
| 2011/0289057 A1 | 11/2011 | Pallagummi | |
| 2011/0289584 A1 | 11/2011 | Palagummi | |

OTHER PUBLICATIONS

"U.S. Appl. No. 12/609,170, Final Office Action mailed May 29, 2012", 19 pgs.

(Continued)

*Primary Examiner* — Hung T Vy
(74) *Attorney, Agent, or Firm* — Gilliam IP PLLC

(57) ABSTRACT

A system and method provide for backing up and restoring using patch level data for operating system and application files. Patch level data for the files in the backup image may be displayed along with current patch level data. Further, files in a backup image may be replaced based on current patch level data indicating a patched version of the file in the backup image is available. Further, upon a restore, if a patched file is available for a corresponding file in a backup image, the patched file may be retrieved from a patch source and used in place of the file that would have been restored from the backup image.

20 Claims, 6 Drawing Sheets

(56) References Cited

OTHER PUBLICATIONS

"U.S. Appl. No. 12/609,170, Non Final Office Action mailed Feb. 2, 2012", 18 pgs.

"U.S. Appl. No. 12/609,170, Response filed May 2, 2012 to Non Final Office Action mailed Feb. 2, 2012", 13 pgs.

"U.S. Appl. No. 12/782,263, Response filed Jun. 19, 2012 to Non Final Office Action mailed Mar. 19, 2012", 11 pgs.

"U.S. Appl. No. 12/782,263, Non Final Office Action mailed Mar. 19, 2012", 15 pgs.

"U.S. Appl. No. 12/782,318, Final Office Action mailed May 11, 2012", 12 pgs.

"U.S. Appl. No. 12/782,318, Non Final Office Action Mailed Jan. 20, 2012", 11 pgs.

"U.S. Appl. No. 12/782,318, Notice of Allowance mailed May 16, 2014", 9 pgs.

"U.S. Appl. No. 12/782,318, Response filed Apr. 16, 2012 to Non Final Office Action mailed Jan. 20, 2012", 12 pgs.

"U.S. Appl. No. 12/782,318, Response filed Jul. 18, 2012 to Final Office Action mailed May 11, 2012", 11 pgs.

Gite, Vivek, "Howto: Linux Add User To Group", [online]. Retrieved from the Internet: http://www.cyberciti.biz/faq/howto-linux-add-user-to-group/], (Accessed Jan. 27, 2012), 15 pgs.

Tanenbaum, Andrew S, et al., "Distributed Systems Principles and Paradigms", Prentice Hall, Inc, (2002), 422-425.

\* cited by examiner

DETERMINING SECURITY HOLES OF A BACKUP IMAGE

RELATED APPLICATION

This application is a Continuation of U.S. application Ser. No. 12/782,318, filed on May 15, 2010, to which priority is claimed and the entirety of which is incorporated herein by reference.

FIELD OF THE INVENTION

The present disclosure relates to computer system backups and recovery, and in various embodiments, determining security holes in a backup image.

BACKGROUND

Virtually any non-trivial computer system includes a data backup and data recovery sub-system. A backup saves files as they exist at the time the backup is made. Backups serve many purposes, including file restoration in the event of accidental deletion or corruption, or for disaster recovery or compliance purposes.

One typical use of backups is to save operating system and application executable files and data. It is common for operating system and application files to be updated after their initial release by a vendor. These updates are referred to as patches. A patch is an update to one or more files of an operating system or application. The patch may serve various purposes, including providing fixes to errors in the software, or providing fixes to potential security vulnerabilities that leave a system open to attack. Such security vulnerabilities are sometimes referred to as security holes, in that they provide an opening for an attacker to attempt to exploit the vulnerability to gain control of the system or to take potentially sensitive information from the system. Because a backup saves files as they exist at the time the backup is made, patches that are released for application after the backup is made are not included in the backup. A subsequent restore of a file that has had a patch released after the backup was made will not include the patch, and will thus be vulnerable to any attacks that may have been cured by the patch.

DETAILED DESCRIPTION

Figure 1:
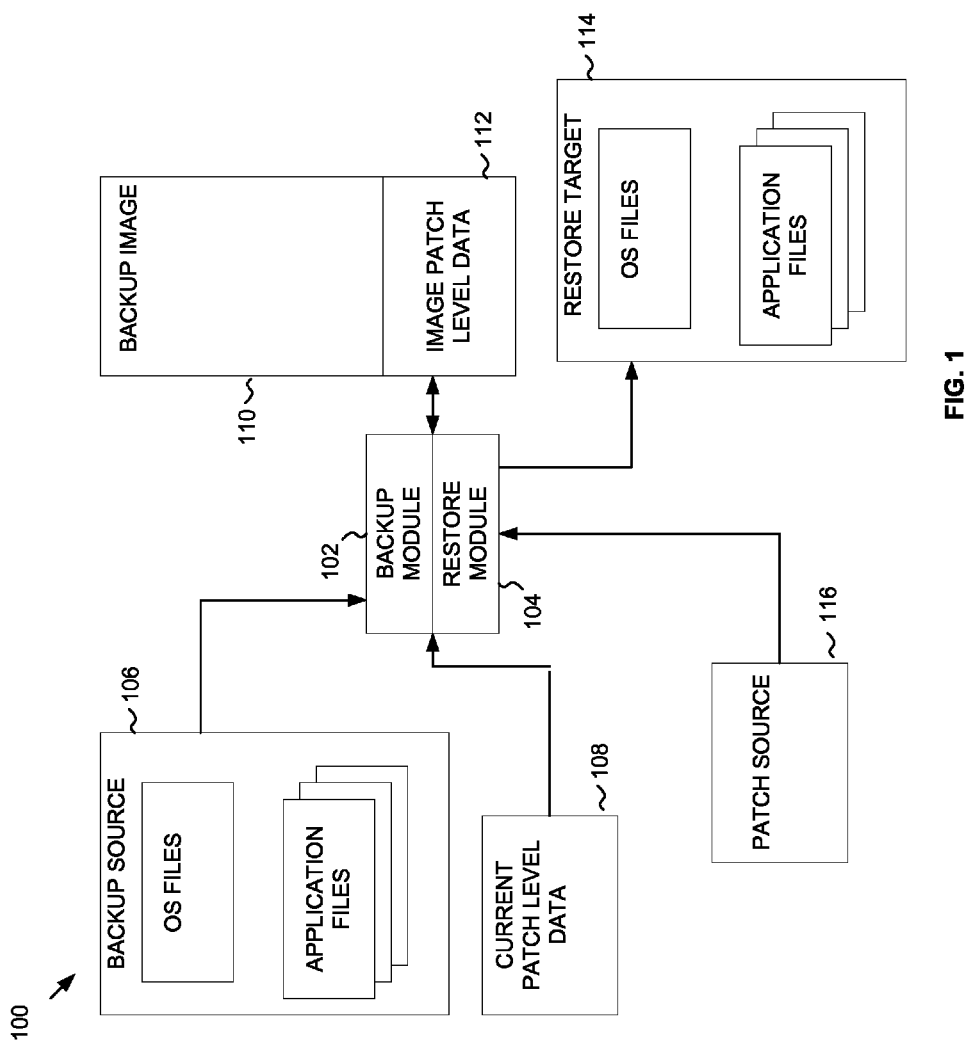
FIG. 1 is a block diagram of a backup and restore system according to embodiments of the invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 is a block diagram of a backup and restore system 100 according to embodiments of the invention. System 100 may include in various embodiments a backup module 102 and a restore module 104. As used herein, a module is any grouping of software, hardware, or firmware routines that perform an indicated task. Backup module 102 receives files and data from a backup source 106 and places the files and data in backup image 110. The backup source may be any source that can be used to persistently store data such as hard drives, DVD-ROMs, CD-ROMs, flash memories or any other persistent storage device. The backup source may include more than one persistent storage device. In addition, the files and data to be backed up may include one, some, or all of the operating system and/or application files and data from a backup source.

Backup image 110 is created at a particular point in time. Backup image 110 may comprise an image on a disk, including disks that reside on network attached storage, or the backup image may reside on removable media such as DVD-ROMs, CD-ROM, flash memory etc. The backup image 110 may be stored onsite, that is, stored on or near the system that is backed up, or the backup image may be stored offsite, that is, remote from the system being backed up.

Restore module 104 restores files and data from a backup image 110 to a desired restore target 114. The restore target 114 may be the same persistent storage that was the source of the backup image. For example, a user may have either accidentally deleted or corrupted one or more files. The backup image can be used to restore the files to their state as of the time the backup image was made. The desired target may be persistent storage on another system such that the other system has a copy of the files and data of the backup source.

Although shown and numbered as separate modules, backup module 102 and restore module 104 may be part of a single software executable, or separate executables that are part of a package. The inventive subject matter is not limited by how the backup and restore modules are organized.

Further, it should be noted that the backup source 106 from which the backup image 110 was made and restored system 114 may be the same system. Further, either or both of the source system from which backup image was made and restored target system 114 may reside on physical hardware or may be part of a virtual machine which emulates physical hardware.

Current patch level data 108 comprises data that identifies the patch levels for operating system files and/or application files at the current point in time. A patch level may be alternatively referred to as a revision level or a version identifier. The current patch level data 108 may also include the release date for a patch. In some embodiments, the current patch level data 108 comprises data maintained by the operating system. For example, the Microsoft Windows® family of operating systems maintains patch level data for the operating system and applications that follow standard Microsoft update procedures. However, some applications may use facilities or procedures for updating that do not follow an operating system standard. Thus the current patch level data 108 may also include files maintained by these other facilities or procedures.

In some embodiments, during backup operations, backup module 102 may incorporate image patch level data 112 with a backup image 110. The image patch level data 112 identifies the patch levels of one or more of the files in the backup image and may be obtained from current patch level data 108. Thus the image patch level data will include patch level data at the time the backup image is created. Further, in some embodiments, the image patch level data includes the release date for the patch.

Patch source 116 is a source for files that are updated to recent patch levels. In some embodiments, patch source 116 may be a system such as a server system that stores update files (i.e., files associated with a patch) for an application or operating system. For example, an application or operating system vendor may provide a patch source 116. In alternative embodiments, patch source 116 may be a system that has received the patched file from an application or operating system vendor.

Further details on the operation of the above-described system are provided below with reference to FIGS. 2A-2D.

FIGS. 2A-2D are flowcharts illustrating backup and restore methods according to embodiments of the invention. The methods include a number of method blocks 202-426. Though arranged serially in the example embodiments described by FIGS. 2A-2D, other examples may reorder the blocks, omit one or more blocks, and/or execute two or more blocks in parallel using multiple processors or a single processor organized as two or more virtual machines or subprocessors. Moreover, still other examples can implement the blocks as one or more specific interconnected hardware or integrated circuit modules with related control and data signals communicated between and through the modules. Thus, any method flow described herein is applicable to software, firmware, hardware, and hybrid implementations.

Figure 2A:
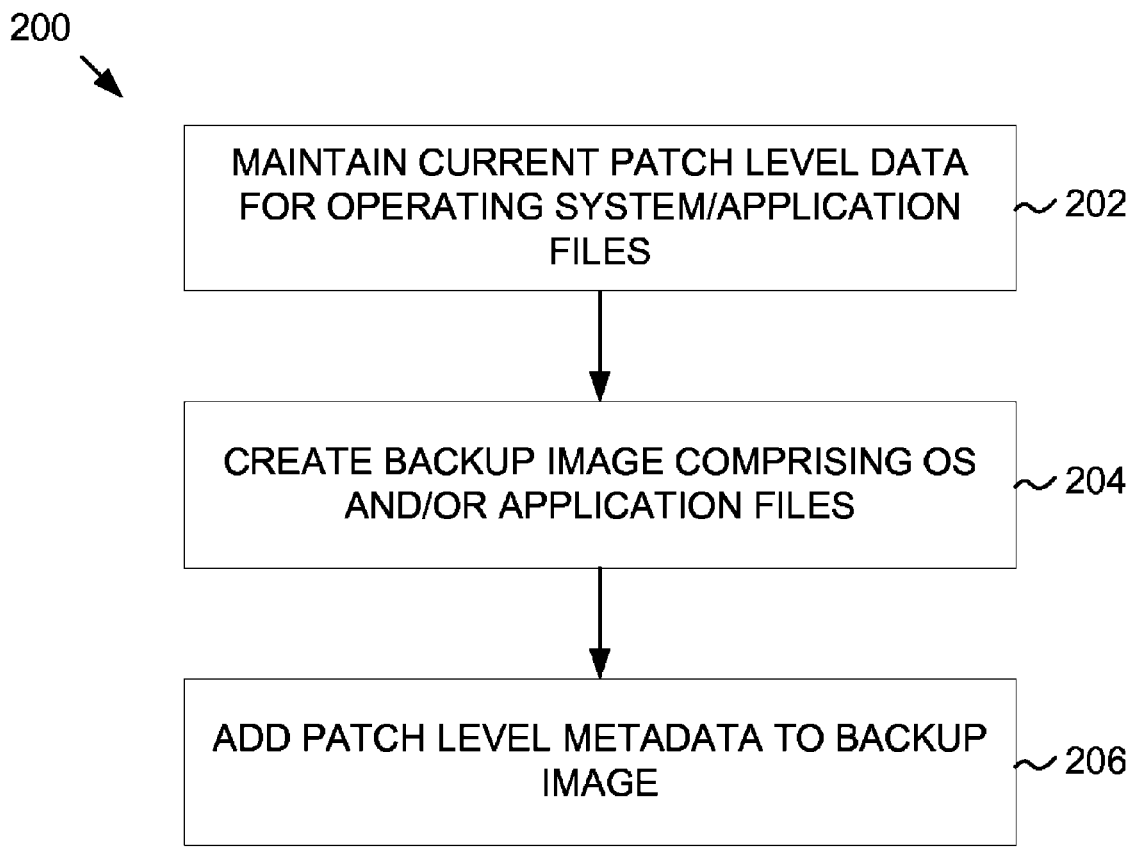
FIGS. 2A-2D are flowcharts illustrating backup and restore methods according to embodiments of the invention.

FIG. 2A is a flowchart illustrating a backup method 200 according to embodiments of the invention. Method 200 begins at block 202 with maintaining current patch level data for various operating system files and/or application files. As noted above, the patch level data may be maintained in multiple places depending on the update methodology used by the operating system or application. In some embodiments, the current patch level data may be maintained in a single database or file using data from multiple sources described above. If resources permit, the current patch level data for multiple host environments (e.g., multiple backup sources) may be maintained at a centralized location or server.

At block 204, a backup process creates a backup image that includes operating system files and/or application files. As noted above, the backup image may comprise an image on a disk, including disks that reside on network attached storage, or the backup image may reside on removable media such as DVD-ROMs, CD-ROM, flash memory etc. The backup may be in response to a user or system administrator request, or the backup may be as a result of a scheduled backup.

At block 206, the backup process adds image patch level data to the backup image. The image patch level data includes patch level data for the files that are included in the backup image. The image patch level data may be obtained from the current patch level data. As noted above, the image patch level data includes the patch levels at the time the backup image is created. The image patch level data may be included as part of other metadata describing the backup image, or it may be included as a separate portion of the backup image.

Figure 2B:
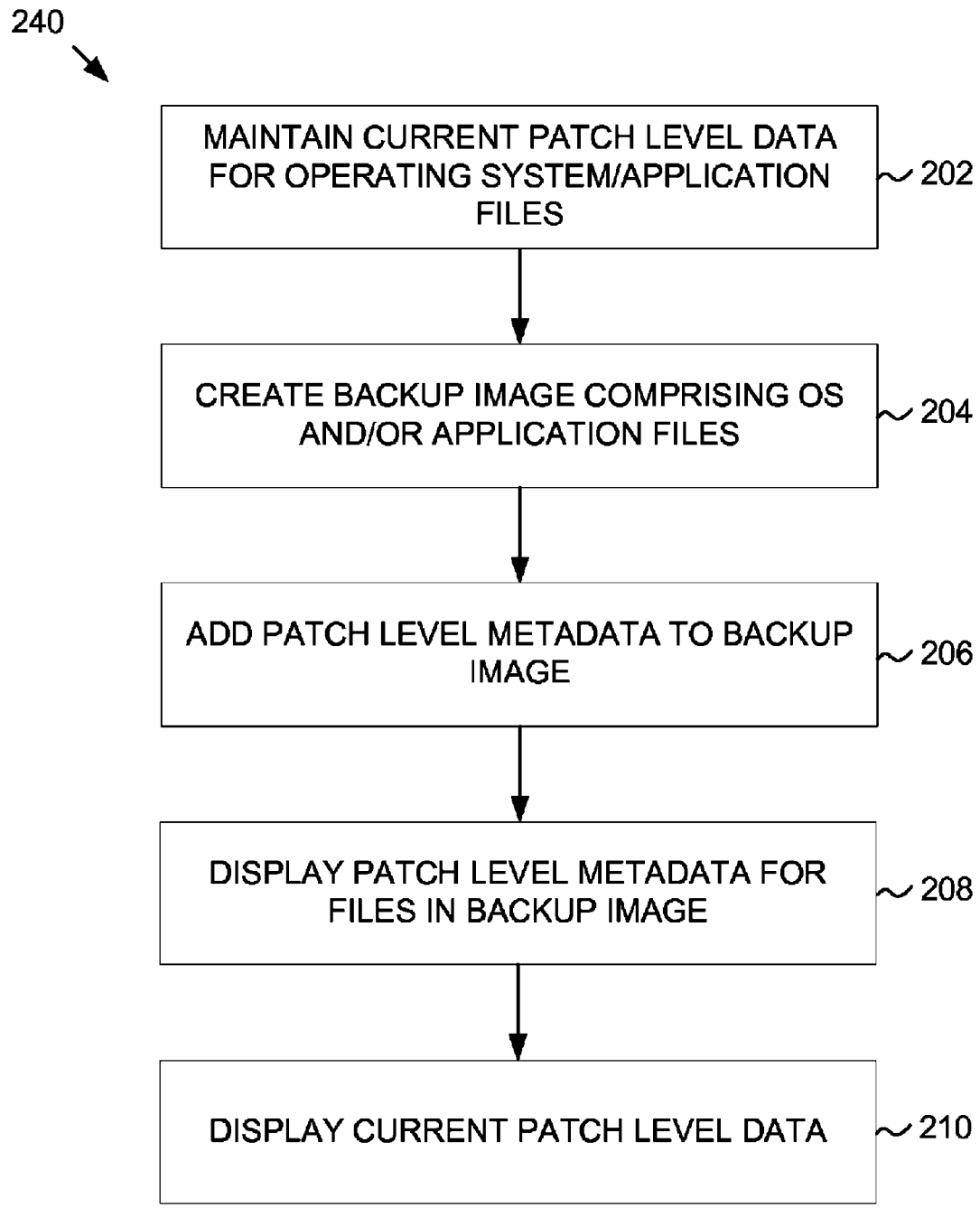

FIG. 2B is a flowchart illustrating a backup and restore method 240 according to embodiments of the invention. Blocks 202-206 of the method have been described above with reference to FIG. 2A. At block 208, the system displays the patch level data for files in the backup image. In some embodiments, the display of patch level data for the files in the backup image may be in response to a request to restore files from the backup image. The request may be the result of a command that is provided to an operating system, as part of an action executed within a graphical user interface of a backup/restore system, or as part of a system recovery process. The patch level data may be organized by application and/or by operating system components such that files associated with an application may be grouped together.

At block 210, the system displays the current patch level data for the files in the backup image. In other words, the backup and restore system identifies files (for example, by file/folder name) in the backup image and consults the current patch level data to obtain the most recently released patch level for the file. Thus in some embodiments, the user can compare the patch level data from the backup image with the current patch level data for the files associated with an application or operating system. The user can then make a decision as to whether or not to proceed with restoring the file or files from the backup image. Further, the user has information that can be used to determine the urgency of applying patches after a file is restored.

Even if the current patch level data to be provided at block 210 is not available, the display of image patch level data may be used by a user to determine an appropriate course of action. For example, the user may have knowledge that a particular patch level is desired from other sources (web sites, news reports etc.) and can use the information provided at block 208 to determine if a restore from the backup image is desirable.

Figure 2C:
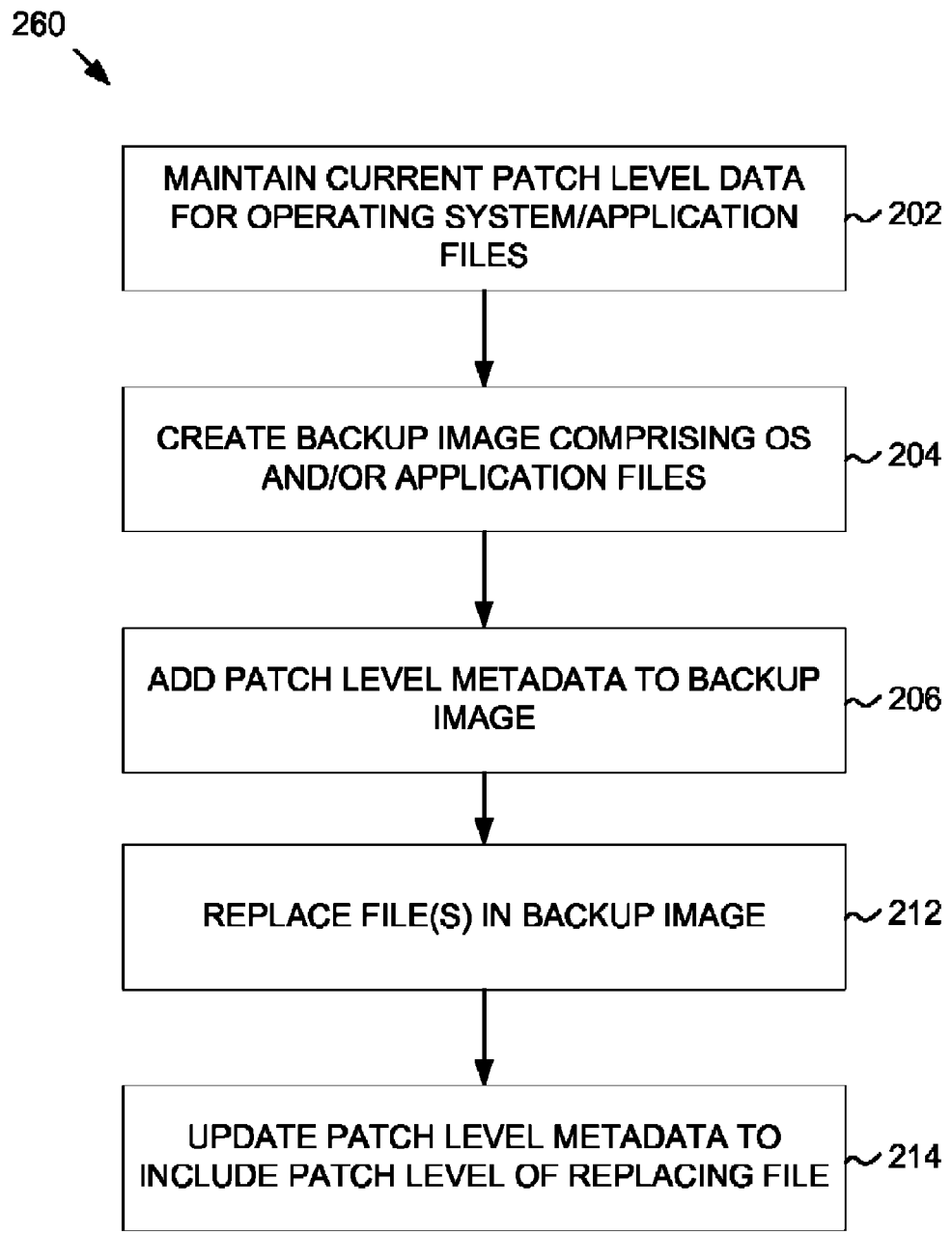

FIG. 2C is a flowchart illustrating a method 260 for updating files in a backup image according to embodiments of the invention. Blocks 202-206 of the method have been described above with reference to FIG. 2A. At block 212, the system replaces files in the backup image with files that have a more recent patch level. For example, in some embodiments, a user may request that a backup image should be analyzed to determine if any of the files in the backup image need updating as a result of recent patches. Alternatively, a system may periodically update onsite backup images. The system may compare the current patch level data with the image patch level data to determine if a file is to be upgraded. Alternatively, the user can be presented with a user interface that displays the patch levels of files in the backup image and the currently available patch level for the files. The user interface may provide a mechanism for the user to select files to be updated in the backup image. Once selected, the system may obtain the patch files to replace the files in the backup image from patch source 116.

At block 214, the image patch level metadata is updated to reflect the new patch levels (and release dates if applicable) associated with the files updated in the backup image.

As can be appreciated from the above, in some embodiments, updating the files in the backup image and updating the patch levels in the image patch level data provides the ability to avoid future updates during a recovery from the backup image.

Figure 2D:
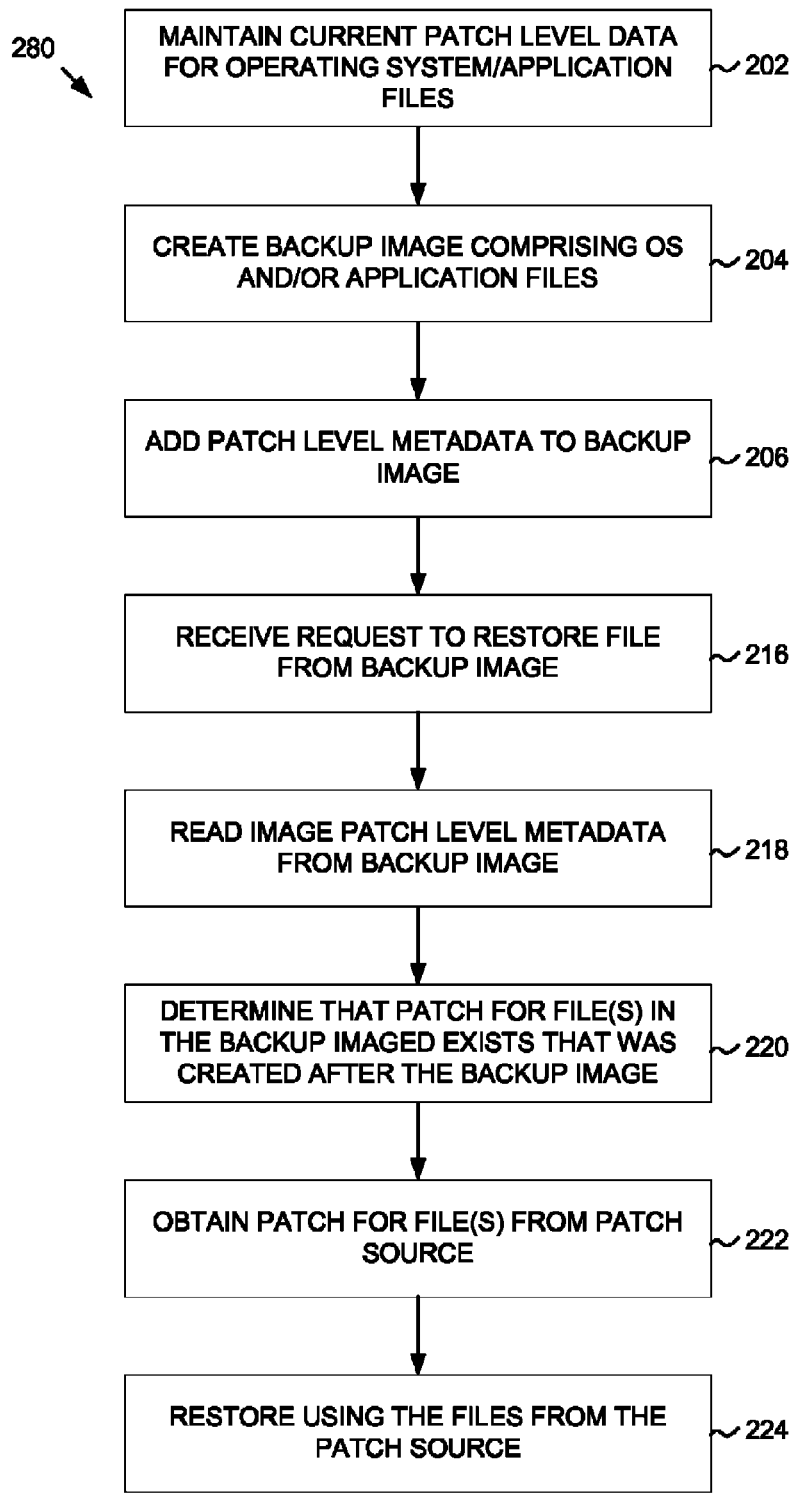

FIG. 2D is a flowchart illustrating a method 280 for restoring files from a backup image to a target system. Blocks 202-206 of the method have been described above with reference to FIG. 2A. At block 216, the restore module may be invoked in response to a request to restore files from a backup image. As discussed above, the request may be a user request, it may be a scheduled request, or it may be a request in response to an automated system recovery.

At block 218, the restore module reads the image patch level metadata from the backup image.

At block 220, the restore module determines that one or more patches exist for one or more files in the backup image, where the patches were released after the backup image was created. In some embodiments, the determination may be based on comparing release dates for patches associated with files in the backup image with release dates for patches in the current patch data. In other embodiments, the determination may be made by comparing patch levels in the image patch level data with patch levels in the current patch data.

At block 222, the restore module obtains an updated (i.e., patched) file having a more recent patch than a corresponding file in the backup image from a patch source. As noted above, the patch source may be a local source or a remote source from the system executing the restore module.

At block 224, the updated file obtained from the patch source is used to restore to the target system in place of the file that is in the backup image.

Figure 3:
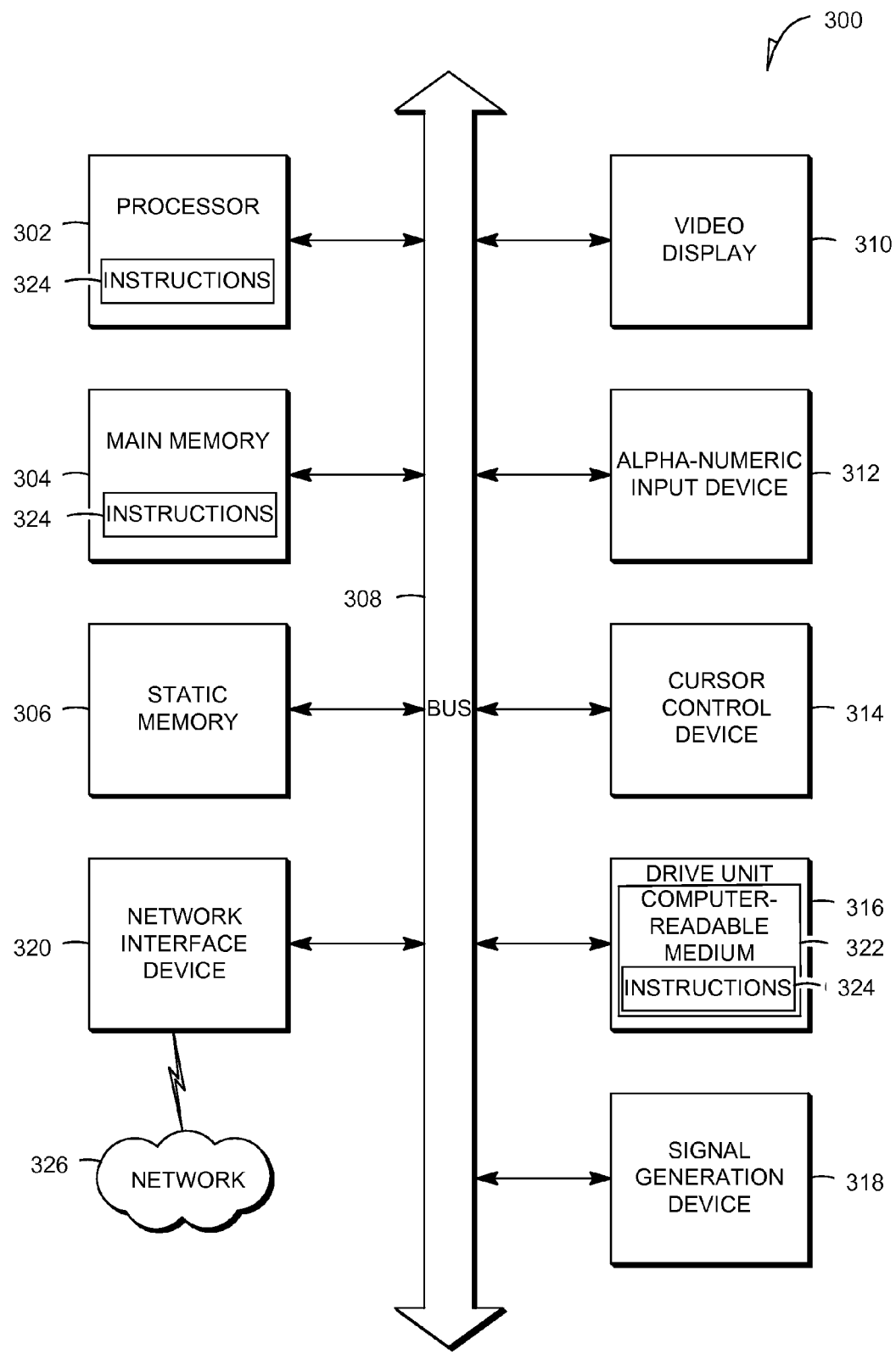
FIG. 3 is a block diagram of an example embodiment of a computer system upon which embodiments inventive subject matter can execute.

FIG. 3 is a block diagram of an example embodiment of a computer system 300 upon which embodiments inventive subject matter can execute. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

As noted above, the backup and recovery system as disclosed herein can be spread across many physical hosts. Therefore, many systems and sub-systems of FIG. 3 can be involved in such a backup and recovery system.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 3, a hardware and operating environment is provided that is applicable to both servers and/or remote clients.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, an example system, method and machine readable medium for a backup and restore system that provides patch level data to users and that uses the patch level data during restore operations has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A method for execution by one or more processors, the method comprising:
   maintaining first patch level data identifying a first patch level for a file;
   creating a backup image, the backup image containing a copy of the file at a creation time of the backup image, the backup image including the first patch level data;
   obtaining current patch level data for the file in the backup image at a second time after the creation time of the backup image, the current patch level data identifying a second patch level for the file;
   comparing the current patch level data to the first patch level data;
   applying a patch to the backup image in response to determining that the first patch level of the file does not match the second patch level of the file; and
   updating the first patch level data to be consistent with the current patch level data in response to applying the patch to the file in the backup image.

2. The method of claim 1, and further comprising:
   reading the first patch level data identifying the first patch level of the file from the backup image.

3. The method of claim 1, and further comprising:
   displaying an urgency of applying a patch including displaying the first patch level data of the file and displaying the current patch level data of the file of the backup image, the urgency indicative of a security hole existing in the file when the file is restored from the backup image.

4. The method of claim 3, wherein displaying the current patch level data includes:
   obtaining one or more release times associated with the current patch level data; and
   displaying the current patch level data upon determining that the one or more release times are after the creation time of the backup image.

5. The method of claim 1, and further comprising:
   replacing the files in the backup image with an updated file having a patch created after the creation time of the backup image; and
   updating the first patch level data with the patch levels of the updated file.

6. The method of claim 1, and further comprising:
   receiving a request to restore the file from the backup image;
   determining that a patch created after the creation time of the backup image exists for the file;
   obtaining an updated file having the patch from a patch source; and
   restoring the file based at least in part on the updated file having the patch.

7. The method of claim 6, wherein obtaining the updated file includes obtaining the updated file from one or more application or operating system vendors.

8. A system comprising:
   one or more processors; and
   a backup module executable by the one or more processors to:
      maintain first patch level data identifying a first patch level for a file;
      create a backup image, the backup image containing a copy of the file at a creation time of the backup image, the backup image including the first patch level data;

obtain current patch level data for the file in the backup image at a second time after the creation time of the backup image, the current patch level data identifying a second patch level for the file;

compare the current patch level data to the first patch level data;

apply a patch to the backup image in response to determining that the first patch level of the file does not match the second patch level of the file; and update the first patch level data to be consistent with the current patch level data in response to applying the patch to the file in the backup image.

9. The system of claim 8, wherein the backup module is further executable by the one or more processors to:

read the image patch level data identifying the patch level of the file from the backup image.

10. The system of claim 8, wherein the backup module is further executable by the one or more processors to:

display an urgency of applying a patch including displaying the first image patch level data of the file and displaying the current patch level data of the file of the backup image, the urgency indicative of a security hole existing in the file when the file is restored from the backup image.

11. The system of claim 10, wherein displaying the current patch level data includes:

obtaining one or more release times associated with the current patch level data; and displaying the current patch level data upon determining that the one or more release times are after the creation time of the backup image.

12. The system of claim 8, wherein the backup module is further executable by the one or more processors to:

replace the files in the backup image with an updated file having a patch created after the creation time of the backup image; and update the first image patch level data with the patch levels of the updated file.

13. The system of claim 8, wherein the backup module is further executable by the one or more processors to:

receive a request to restore the file from the backup image;

determine that a patch created after the creation time of the backup image exists for the file;

obtain an updated file having the patch from a patch source; and restore the file based at least in part on the updated file having the patch.

14. The system of claim 13, wherein obtaining the updated file includes obtaining the updated file from one or more application or operating system vendors.

15. A computer readable storage device having instructions stored thereon that when executed by one or more processors, causes a computing device to:

maintain first patch level data identifying a first patch level for a file;

create a backup image, the backup image containing a copy of the file at a creation time of the backup image, the backup image including the first patch level data;

obtain current patch level data for the file in the backup image at a second time after the creation time of the backup image, the current patch level data identifying a second patch level for the file;

compare the current patch level data to the first patch level data;

apply a patch to the backup image in response to determining that the first patch level of the file does not match the second patch level of the file; and update the first patch level data to be consistent with the current patch level data in response to applying the patch to the file in the backup image.

16. The computer readable storage device of claim 15, wherein the instructions, when executed by the one or more processors, further causes the computing device to:

read the image patch level data identifying the patch level of the file from the backup image.

17. The computer readable storage device of claim 15, wherein the instructions, when executed by the one or more processors, further causes the computing device to:

display an urgency of applying a patch including displaying the first image patch level data of the file and displaying the current patch level data of the file of the backup image, the urgency indicative of a security hole existing in the file when the file is restored from the backup image.

18. The computer readable storage device of claim 17, wherein displaying the current patch level data includes:

obtaining one or more release times associated with the current patch level data; and displaying the current patch level data upon determining that the one or more release times are after the creation time of the backup image.

19. The computer readable storage device of claim 15, wherein the instructions, when executed by the one or more processors, further causes the computing device to:

replace the files in the backup image with an updated file having a patch created after the creation time of the backup image; and update the first image patch level data with the patch levels of the updated file.

20. The computer readable storage device of claim 15, wherein the instructions, when executed by the one or more processors, further causes the computing device to:

receive a request to restore the file from the backup image;

determine that a patch created after the creation time of the backup image exists for the file;

obtain an updated file having the patch from a patch source; and restore the file based at least in part on the updated file having the patch.

* * * * *